Figure 1:
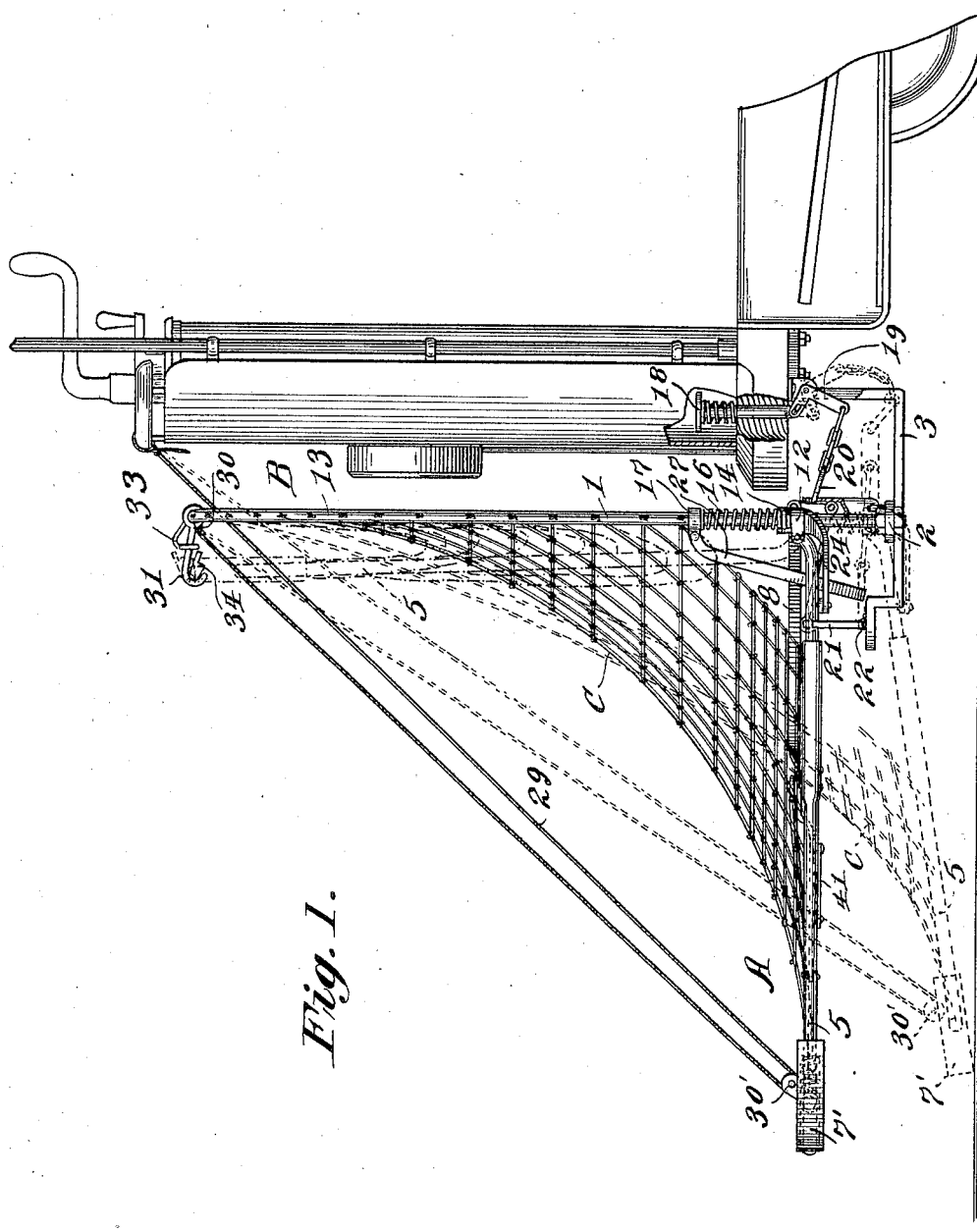

R. H. POGUE.
CAR FENDER.
APPLICATION FILED OCT. 25, 1910.

1,038,955.

Patented Sept. 17, 1912.
4 SHEETS—SHEET 1.

Witnesses
A. H. Lybrand

Inventor
Robert H. Pogue
By Victor J. Evans
Attorney

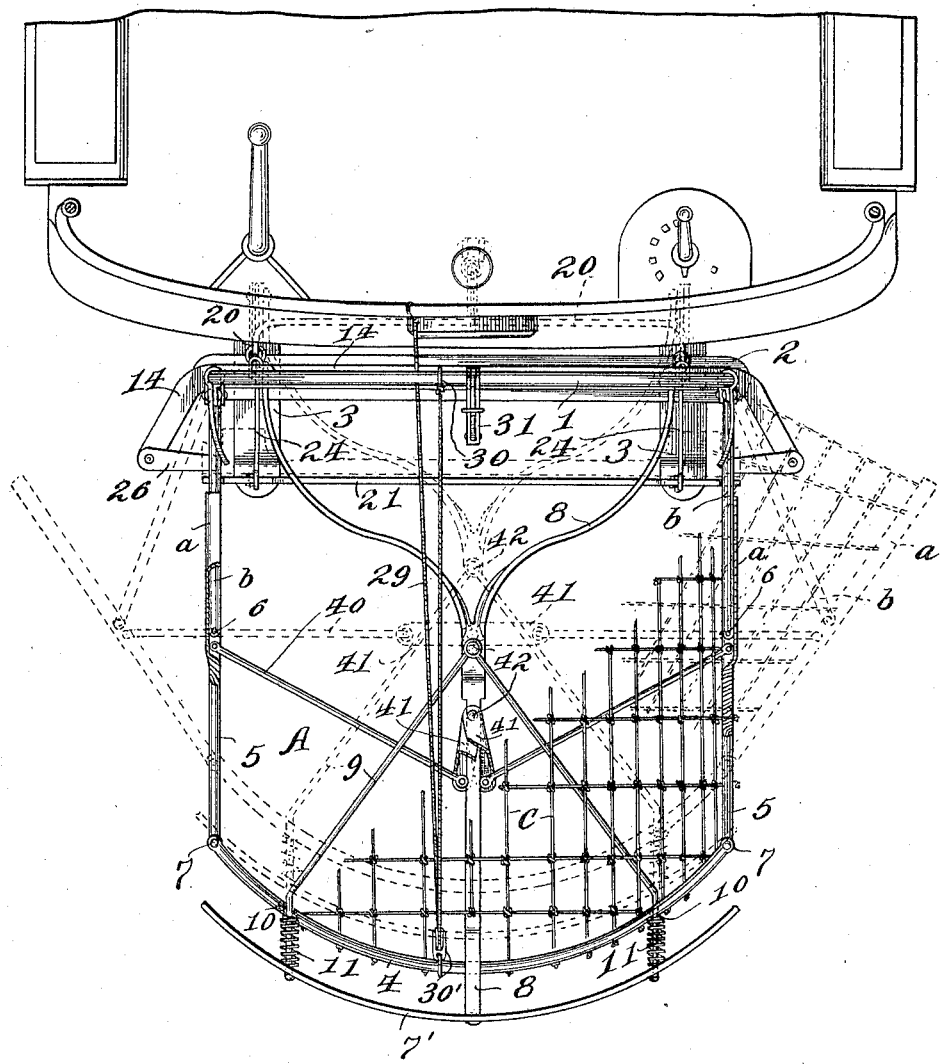

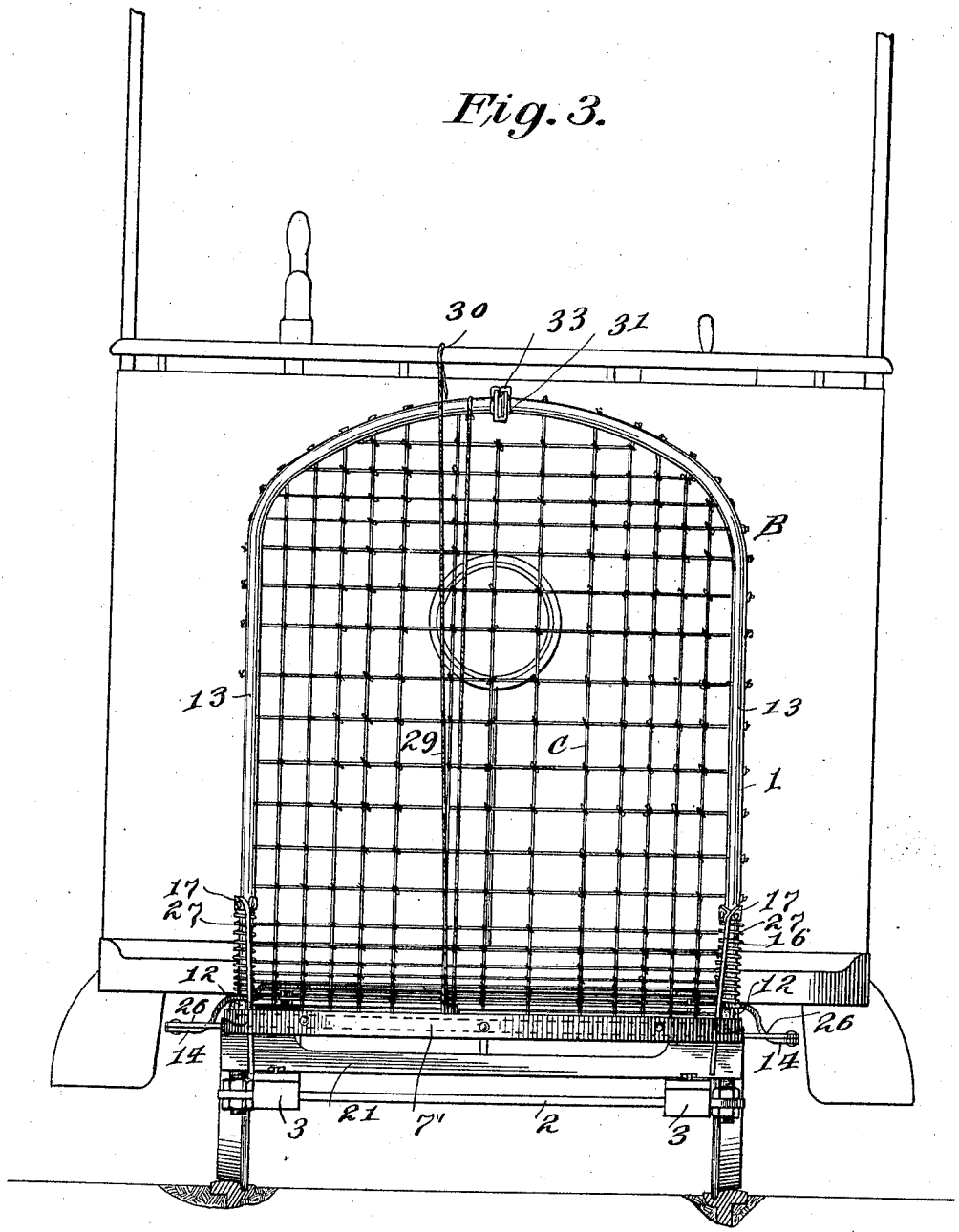

R. H. POGUE.
CAR FENDER.
APPLICATION FILED OCT. 25, 1910.
1,038,955.
Patented Sept. 17, 1912.
4 SHEETS—SHEET 4.
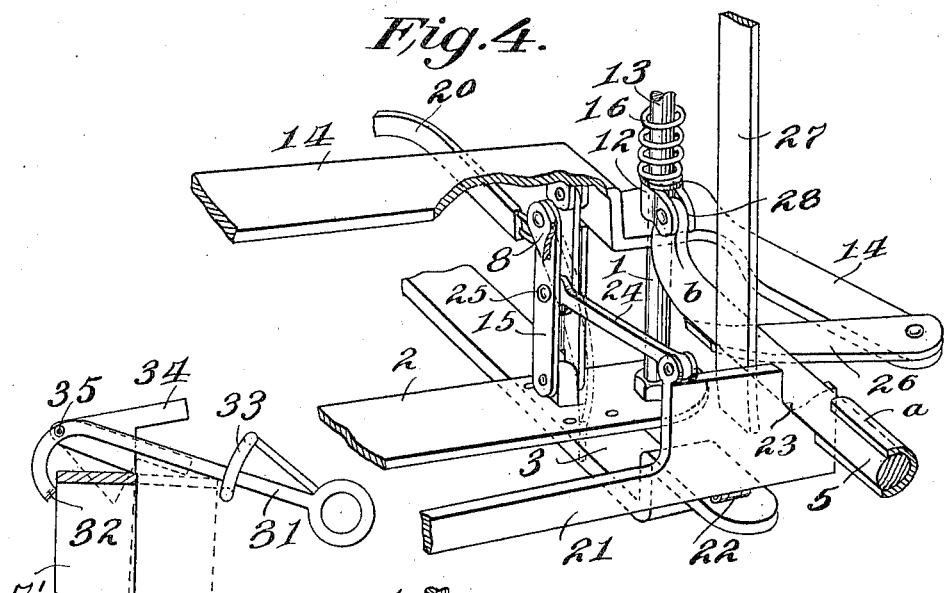
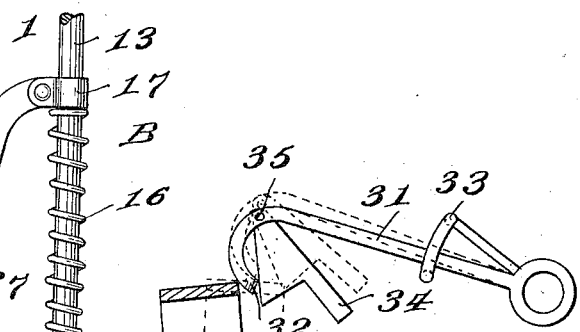
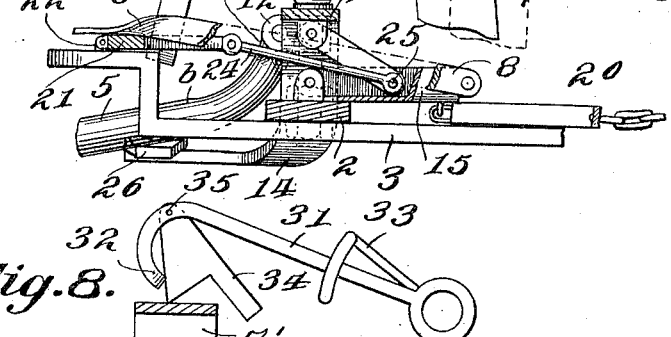
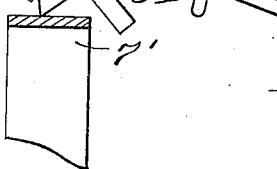
Witnesses
N. H. Lybrand
C. Bradway
Inventor
Robert H. Pogue
By Victor J. Evans
Attorney

UNITED STATES PATENT OFFICE.

ROBERT H. POGUE, OF NEW WESTMINSTER, BRITISH COLUMBIA, CANADA.

CAR-FENDER.

1,038,955.  Specification of Letters Patent.  Patented Sept. 17, 1912.

Application filed October 25, 1910. Serial No. 588,977.

*To all whom it may concern:*

Be it known that I, ROBERT H. POGUE, a subject of the King of Great Britain, residing at New Westminster, in the Province of British Columbia and Dominion of Canada, have invented new and useful Improvements in Car-Fenders, of which the following is a specification.

This invention relates to a car fender of that type which is normally supported sufficiently above the track surface to avoid small objects on the track, but which is automatically dropped close to the track surface when the fender strikes a person so as to prevent the person getting knocked down and run over.

The invention has for one of its objects to improve and simplify the construction and operation of fenders of this character so as to make them comparatively simple and inexpensive to manufacture, reliable and efficient in use, and capable of easy adjustment in their operative or inoperative positions.

Another object of the invention is the provision of a fender which automatically spreads while it drops close to the track surface, so that a person or object struck by the fender will be rolled or deflected to one side or the other clear of the car.

Another object is the provision of an improved trip or releasing means whereby the fender may be automatically dropped and spread when an obstacle is struck.

A further object is the employment of a novel catch device for holding the fender folded.

An additional object is the provision of a fender which can be either automatically or manually dropped and spread, as when an obstacle is struck or when the motorman releases the device to avert danger.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one embodiment of the invention, Figure 1 is a side view of the fender showing the parts by full, dotted and dash lines, respectively, in normal, dropped and folded positions. Fig. 2 is a plan view showing by full lines the parts in normal position, and by dotted lines the fender dropped and spread. Fig. 3 is a front view of the fender. Fig. 4 is a perspective view of a portion of the mechanism for holding the fender normally raised off the track in set position. Fig. 5 is a detail sectional view taken longitudinally of the rear portion of the fender to show the position of the parts when the fender is dropped. Figs. 6, 7, and 8 are detail views showing in different positions, the device for holding the fender folded.

Similar reference characters are employed to designate corresponding parts throughout the views.

Referring to the drawings, A designates the horizontally-extending portion or frame of the fender, and B, the supporting frame therefor. The supporting frame consists of an upright structure formed by an arched metal bar 1 that has its lower end fastened to a horizontal cross piece or base 2. This base piece is secured at its ends to bars 3 that are fastened to the car in any suitable manner. The frame A is movably mounted on the frame B and is normally supported at a suitable height above the track surface, but when the fender is stretched, the frame A drops into close proximity to the track and at the same time spreads laterally for the purpose of deflecting an object to the side of the track and out of line with the wheels of the car. Attached to the top and sides of the frame B and also to the front and sides of the frame A is a suitable net C to catch a person struck by the fender and thereby prevent injury.

The frame A consists of a front bar 4 that extends transversely to the track and is bowed forwardly, and this bar is supported on the front ends of the side bars 5, the latter each consisting of sections *a* and *b* connected by hinge joints 6. The front ends of the side bars are hingedly connected at 7 to the ends of the front bar 4 and the joints 6 are so arranged that they will break outwardly and cause the front sections *a* to extend approximately in alinement with the bar 4 and form practically continuations thereof. This outward collapsing or breaking of the side bars occurs at the time the frame A drops after having struck a person or obstacle, and in doing this the net C is spread out laterally. The joints 6 are located forwardly from the rear end of the section *a*, so that the latter will project laterally a considerable distance from the rails of the track so as to positively insure against a person passing under the wheels of the car. Extending parallel with and in front of the bar 4 is a yielding guard and trip bar 7 which is connected with a trip or releasing rod or element 8. This element 8 extends centrally between the side bars and across the middle of the bar 4 and is centrally connected with the guard 7.

Diagonal braces 9 connect the rear portion of the element 8 with the end of the guard 7 so as to hold the latter properly in position. The braces 9 pass through openings 10 in the front bar 4, and arranged on these braces and interposed between the front bar 4 and guard 7 are springs 11. These springs form cushioning means so as to reduce the shock when the fender strikes a person. The rear ends of the side bars 5 are pivoted to eyes 12 that slide on the vertical members 13 of the upright frame B, and extending transversely from one member 13 to the other is a horizontal bar or member 14 that has openings through which the members 13 extend, the member 14 being continued beyond the vertical members 13 so as to form forwardly curved terminal extensions. The eyes 12 rest on the terminal extensions of the bar 14 so that the rear end of the frame A will be raised and lowered therewith. Interposed between the base support 2 and bar 14 are two pairs of toggle links 15 which collapse rearwardly so as to permit the fender to drop.

The dropping of the fender is assisted by compression springs 16 coiled around the side members 13 of the frame B and interposed between the eyes or collars 12 and abutments 17 which are suitably fastened on the members 13. When the frame A is raised and held in normal position by the toggle links 15 being straight, the springs will be under compression, and as soon as the toggle links are broken, the springs will expand and force the frame A downwardly. The toggle links 15 are broken or collapsed by the element 8 being connected therewith, the said element having its rear end formed into a fork, as shown in Fig. 2 so that its extremities can be connected with both pairs of toggle links, one of said extremities being shown partly broken away, as represented by dotted lines and designated 8 in Figs. 4 and 5. When the guard 7 is struck, the element 8 moves backwardly and breaks the toggle links. The breaking of the toggle links can also be effected by the motorman when he sees that a person is about to be struck. To do this, he presses a foot button 18 on the front platform and thereby pulls the lower arm of a bell crank lever 19 and the forked element 20 that is connected with both pairs of toggle links rearwardly. The frame A is normally supported at a point intermediate its ends by a transverse member 21 which is hinged at 22 to the forward ends of the bars 3. This member 21 has seats 23 at its ends for receiving side bars 5 of the frame A. The enlargements near the ends are each connected by a longitudinally-extending link 24 with a central hinge 25 of the toggle links. Normally, the member or support 21 is disposed in a vertical plane, and when the toggle links are broken, the said support swings rearwardly and downwardly flat against the parts 3 and in doing this the frame A is permitted to drop. When the frame A drops and expands, the rear sections $b$ of the side bars 5 slide outwardly on rests 26 supported by and riveted to the ends of the transverse bar 14 so that the frame A will not strike the track surface. Fastened to the abutments 17 of the frame B are downwardly-extending arms 27 that engage the side bars 5 so as to prevent inward swinging of the frame A.

The fender is adapted to be folded when not in use, and when in folded position, the frame A will be approximately vertical or in parallelism with the frame B. For this purpose, the side bars 5 of the frame A are hingedly connected at 28 to the eyes or collars 12. The folding is effected by means of a rope 29 that is fastened at one end 30 to the top of the frame B and extends downwardly to and around a guide pulley 30' on the front of the frame A and thence extends upwardly to a point conveniently within reach of the motorman. By pulling upwardly on this rope, the lower frame A is raised until the guard 7 strikes the hook 31 fastened to the top of the frame B. This hook has a downwardly-extending bill 32 that is normally held by a bracket 33 in the path of the guard 7 of the frame A so that when the said frame is raised, the guard will strike the bill and cause the hook to rise to the dotted line position, Fig. 6, so as to permit the guard to slide upon and then pass behind the bill and catch, as shown by full lines in Fig. 7. The hook is provided with a releasing device 34, which is a member pivoted at 35 on the bill of the hook. When the frame A is engaged with the hook, the device 34 is raised by being engaged with the guard 7, and when it is desired to permit the frame A to swing downward to normal position, the motorman pulls the frame backwardly to the dotted line position, Fig. 7, so that the device 34 can drop on and engage the top of the guard 7, as shown in Fig. 8. The motorman now releases the pull on the rope so that the frame A can swing downwardly, and during this movement, the device 34 holds the bill of the hook raised above the guard 7 so that the frame A can swing downwardly without interference. After the frame A has been dropped, it is merely necessary to raise the sliding bar 14 and press inwardly on the side members 5 of the frame A. To insure the simultaneous and even opening or spreading of the side bars 5, rods 40 are connected to the side bars 5 adjacent the joint 6, and the inner ends of these rods 40 are connected to the forward ends of links 41 that have their rearward ends connected at 42 with the element 8 so that as the latter moves rearwardly, the rods 40 break the joints of the side bars 5 to effect the spreading of the fender.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described the invention, what I claim as new, is:—

1. In a car fender, the combination of a forwardly-projecting frame having jointed side members adapted to break outwardly, a device adapted to strike an obstacle in the track, and means for connecting the device with both sides of the frame for breaking the joints thereof and causing the frame to spread.

2. In a car fender, the combination of a forwardly-projecting frame having jointed side members adapted to break outwardly, a device adapted to strike an obstacle in the track, means for connecting the device with both sides of the frame for breaking the joints thereof and causing the frame to spread, means for normally supporting the frame a suitable distance above the track, and means for operatively connecting the last-mentioned means with said device for effecting the dropping of the frame.

3. In a car fender, the combination of a forwardly-projecting frame having jointed side members adapted to break outwardly, a device adapted to strike an obstacle in the track, means for connecting the device with both sides of the frame for breaking the joints thereof and causing the frame to spread, means for normally supporting the frame a suitable distance above the track, means for operatively connecting the last-mentioned means with said device for effecting the dropping of the frame, a support on which the frame is mounted, and springs mounted on the support and arranged to assist in the dropping of the frame when an obstacle is struck by the said device.

4. In a car fender, the combination of a frame consisting of a front bar and side members hingedly connected therewith and composed of jointed sections, means for supporting the side members, a combined guard and trip disposed forwardly of the front bar, and means connecting the guard and trip with the said side members for breaking the joints thereof and spreading the frame laterally when an obstacle is struck by the guard and trip.

5. In a car fender, the combination of a frame consisting of a front bar and side members hingedly connected therewith and composed of jointed sections, means for supporting the side members, a combined guard and trip disposed forwardly of the front bar, means connecting the guard and trip with the said side members for breaking the joints thereof and spreading the frame laterally when an obstacle is struck by the guard and trip, means for normally holding the frame raised, and an operative connection between the guard and trip and said last-mentioned means for causing the frame to drop simultaneously with the spreading thereof.

6. In a car fender, the combination of a frame including a front bar and side bars, said side bars consisting of front and rear sections hingedly connected together, a device disposed in front of the front bar to strike obstacles on the track, and means operatively connected with the said device and with the side members for causing the front sections of the latter to be thrown into alinement with the front bar when said device strikes an obstacle.

7. In a car fender, the combination of a frame including a front bar and side bars, said side bars consisting of front and rear sections hingedly connected together, a device disposed in front of the front bar to strike obstacles on the track, means operatively connected with the said device and with the side members for causing the front sections of the latter to be thrown into alinement with the front bar when said device strikes an obstacle, and means normally holding the frame raised and operatively connected with the device to permit the frame to drop when an obstacle is struck.

8. In a fender, the combination of a frame including a front bar and side bars, said side bars consisting of front and rear sections hingedly connected together, a device disposed in front of the front bar to strike obstacles on the track, means operatively connected with the said device and with the said members for causing the front sections of the latter to be thrown into alinement with the front bar when said device strikes an obstacle, and cushioning means interposed between the said device and front bar.

9. In a car fender, the combination of a forwardly-extending frame, a supporting structure on which the rear end of the frame is movably mounted, means for holding the rear end of the frame normally raised, means engaging an intermediate portion of the frame for holding the front thereof normally raised, and a device operatively connected with both means to cause the latter to drop the frame when an obstacle is struck.

10. In a car fender, the combination of a forwardly-extending frame capable of spreading laterally when an object is struck, a supporting structure on which the rear end of the frame is movably mounted, means for holding the rear end of the frame normally raised, means engaging an intermediate portion of the frame for holding the front thereof normally raised, a device operatively connected with both means to cause the latter to drop the frame when an obstacle is struck, and means between the said device and sides of the frame for spreading the latter simultaneously with the dropping movement.

11. In a car fender, the combination of an upright supporting frame, a forwardly-extending frame movably mounted thereon, toggle links operatively connected with the frames for normally holding the rear end of the second frame raised, means operatively connected with the toggle links and engaging an intermediate portion of the second frame to hold the front thereof normally raised, and a device operatively connected with the toggle links and said means and causing the frame to drop when an obstacle is struck.

12. In a car fender, the combination of an upright supporting frame, a forwardly-extending frame movably mounted thereon, toggle links operatively connected with the frames for normally holding the rear end of the second frame raised, means operatively connected with the toggle links and engaging an intermediate portion of the second frame to hold the front thereof normally raised, a device operatively connected with the toggle links and said means and causing the frame to drop when an obstacle is struck, and means operatively connected with the said device for spreading the frame laterally simultaneously with the dropping movement.

13. In a car fender, the combination of a supporting frame, a forwardly-extending frame movably mounted thereon, means for normally holding the second frame raised, a device for causing the frame to drop when an obstacle is struck, means on the supporting frame for preventing lateral movement of the second frame when in raised position, means operatively connected with the device for spreading the frame when an obstacle is struck, and means on the supporting frame for supporting the second frame when spread.

14. A car fender comprising an upright supporting frame, a forwardly-extending frame hingedly connected with the bottom thereof and adapted to fold upwardly in front of the supporting frame, means connected with the frames for folding the fender, a device mounted on the top of the supporting frame for automatically engaging the other frame to hold the latter in folded position, and means on the device rendered operative by pulling the second frame rearwardly when in folded position for throwing the device clear of the second frame to permit the latter to swing downwardly to normal position.

In testimony whereof I affix my signature in presence of two witnesses.

ROBERT H. POGUE.

Witnesses:
SAMUEL POGUE,
ADAM S. JOHNSTON.